3,359,290
PRODUCTION OF OMEGA-AMINOKETO-
CARBOXYLIC ACIDS
Siegfried Huenig, Hoechberg, near Wurzburg, and Eberhard Luecke, Ludwigshafen (Rhine), Germany, assignors to Badische Anilin- & Soda-Fabrik Aktiengesellschaft, Ludwigshafen (Rhine), Germany
No Drawing. Filed Jan. 3, 1964, Ser. No. 335,687
Claims priority, application Germany, Jan. 10, 1963, B 70,271
3 Claims. (Cl. 260—404)

ABSTRACT OF THE DISCLOSURE

Production of omega-aminoketocarboxylic acids of Formula I, below, by acid or alkaline hydrolytic cleavage of bicyclic compounds of Formula II, below at a pH above 13 or a pH below 1 at 80°–110° C., which aminoketocarboxylic acids are useful in production of polyamides.

This invention relates to a process for the production of ω-aminoketocarboxylic acids having the general formula:

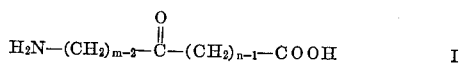

$$H_2N-(CH_2)_{m-2}-\overset{O}{\overset{\|}{C}}-(CH_2)_{n-1}-COOH \qquad I$$

in which $m$ is a whole number from 5 to 15, preferably 5 to 9, and $n$ is a whole number from 5 to 12 preferably 5 to 7, or of salts of these acids.

The invention has for its object to provide a process by which aminocarboxylic acids which can only be obtained with difficulty by prior art methods can be obtained more simply and in greater purity. The said acids are important starting materials for the production of new polyamides.

The invention also has for its object to provide a process for the production of aminoketocarboxylic acids which could not hitherto be prepared.

We have found that these objects are achieved in a remarkable reaction by acid or alkaline hydrolytic cleavage of bicyclic compounds having the general Formula II:

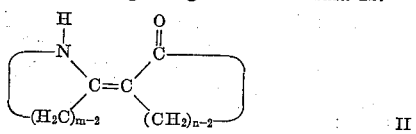

in which $m$ and $n$ have the meanings given above and denote the number of members in the rings.

The initial compounds II are obtainable from lactimsulfonic acid esters III:

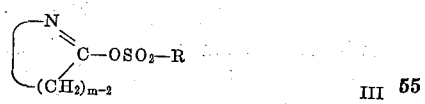

and enamines of cyclic ketones IV:

In this formulae, $m$ and $n$ have the meanings given above and R denotes identical or different organic radicals or the two R's in Formula IV may form with the N a heterocyclic ring. Greater detail concerning the preparation of such compounds may be found in U.S. patent application Ser. No. 315,366, filed Oct. 10, 1963, by Siegfried Huenig and Eberhard Luecke.

Hydrolysis of the initial compounds II leads, in conformity to a law which has not yet been clarified, to the desired compounds I and also to omega-aminocarboxylic acids having the Formula V:

$$H_2N-(CH_2)_{m-2}-COOH \qquad V$$

as a definite substance. It has been observed however that compounds II having a number of rings $n$ of 5 to 7 are convertible to a preponderant extent into the desired products and that even compounds II having very large rings having the number $n$ equal to 12 still give satisfactory yields of compounds I.

The following may be given as the range of conditions: Alkaline hydrolysis with aqueous solutions, for example of sodium hydroxide, potassium hydroxide, calcium hydroxide and potassium carbonate, having a pH above 13 or acid hydrolysis at below pH 1 at temperatures between 80° C. and 110° C. in the course of a few hours with aqueous solutions of, for example, hydrogen chloride, hydrogen bromide, sulfuric acid or phosphoric acid. Lowering the temperature and decreasing the OH⁻ or $H_3O^+$ ion activity retards the reaction, rise in temperature only accelerates it. in all cases the characteristics of the reaction, namely hydrolysis to I and also to V, are not changed. It is also possible to carry out the hydrolysis with alcoholic alkaline liquors, for example with solutions of sodium hydroxide and ethylene glycol monomethyl ether.

The reaction mixture obtained by the hydrolysis may be worked up in the usual way, for example by extracting the resinous and oily impurities formed by the reaction by means of an organic solvent from the aqueous mixture or from the mixture to which water has been added, acidifying the aqueous phase when it is alkaline, and evaporating to dryness. The residue is if necessary extracted with a hot polar organic solvent, the extract again evaporated and taken up with such an amount of hot acid, alkali or hot water that the desired product crystallizes out therefrom in the form of its salt upon cooling— or in free form at the isoelectric point. Any contamination, for example by aminocarboxylic acids V, may be removed for example by further recrystallization.

The process according to this invention makes a valuable contribution to the art because it makes long chain omega-aminoketocarboxylic acids available. Omegaaminoketocarboxylic acids, in which the sum of $m$ and $n$ is between 14 and 22, have not hitherto been described.

Thus for example new fields are opened up to polyamide chemistry, particular importance attaching to the acids having eleven and twelve carbon atoms.

The following examples will further illustrate this invention. The parts specified in the examples, unless otherwise stated, are parts by weight and they bear the same relation to parts by volume as the kilogram to the liter (S.T.P.).

Example 1

For the production of 11-amino-6-keto-undecanic acid: A mixture of 35.8 parts of 2-(2'-azacycloheptenylidene)-cyclopentanone:

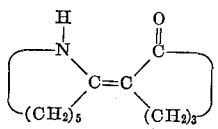

and 660 parts by volume of normal aqueous caustic potash solution is boiled for five hours under reflux. Small amounts or resinous byproducts form and these are extracted with benzene after the hydrolysis is over. The aqueous solution remaining is strongly acidified with concentrated hydrochloric acid and evaporated to dryness in vacuo. The light gray brown residue remaining is extracted with hot β-methoxypropionitrile. When the extract is cooled, a brownish precipitate is thrown down which is processed in the usual way. 19.3 parts (37% of the theory) of a powder is obtained which contains a little 6-aminocaproic acid hydrochloride in addition to the hydrochloride of the desired product.

To separate the byproduct, the powder is dissolved in a little water, the solution neutralized with 2 N caustic soda solution, the solution evaporated to dryness in a rotational evaporator and the residue remaining recrystallized from a little water.

11-amino-6-ketoundecanic acid is obtained as colorless prisms having a melting point of 164° C. to 165° C.

If the hydrolysis of the initial compound is carried out in acid medium and the hydrolysis product is otherwise worked up in the same way, 11-amino-6-ketoundecanic acid is obtained as a crude product in a yield of 85%. 35.8 parts of the initial compound is heated under reflux with 200 parts by volume of aqueous concentrated hydrochloric acid for one hour.

Example 2

For the production of the hydrochloride of 12-amino-7-ketolauric acid:

A mixture of 58 parts of 2-(2'-azacycloheptenylidene)-cyclohexanone:

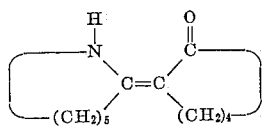

and 1000 parts by volume of 5% caustic soda solution is boiled for five hours under reflux, the initial compound, which floats on the surface as an oil, passing into solution apart from a slight residue.

The reaction mixture is filtered through active carbon, the resultant clear yellow solution is acidified with concentrated hydrochloric acid and evaporated to dryness. The residue remaining is extracted with hot β-methoxypropionitrile. A pale brown powder is obtained which, when recrystallized from water, gives the desired compound in the form of its hydrochloride having a melting point of 136° C. to 138° C.

The free acid may be recovered therefrom in a simple way.

Example 3

For the production of the hydrochloride of 18-amino-13-ketostearic acid:

A mixture of 13.9 parts of 2-(2'-azacycloheptenylidene)-cyclododecanone:

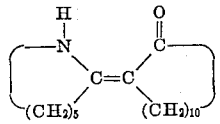

and 250 parts by volume of normal aqueous caustic potash solution is boiled for fourteen hours under reflux. After the oily turbid solution has been cooled, it is diluted with water. A suspension is obtained whose solids content is removed by extraction with benzene. The aqueous remaining has 2 N acetic acid added to it. The desired acid thus precipitated is washed with acetone. The yield is 21% of the theory. A hot solution of the acid in hydrochloric acid is cooled and the hydrochloride crystallizes out in lustrous leaflets having a melting point of 147° C.

If the initial compound be hydrolyzed with a solution of 120 parts by volume of ethylene glycol monomethyl ether and 6 parts of sodium hydroxide in the course of twelve hours at the boiling temperature of the solution and the reaction mixture is worked up otherwise in the same way, the hydrochloride of the aminoketostearic acid is obtained in a 51% yield.

Example 4

For the production of 14-amino-7-ketomyristic acid:
66 parts of 2-(2'-azacyclononylidene)-cyclohexanone:

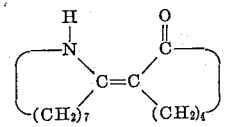

is boiled under reflux with 500 parts by volume of normal caustic soda solution for five hours, the reaction mixture is filtered through active carbon and 500 parts by volume of normal acetic acid is added to the clear yellow solution obtained, 14-amino-7-ketomyristic acid thus being deposited. The yield of this acid is 74%. The melting point is 160° C. to 161° C. and, after purification, 168° C. to 169° C.

The acid is converted in the usual way into its hydrochloride. This gives colorless leaflets from water; melting point 153° C. to 154° C.

Example 5

For the production of 18-amino-7-ketostearic acid:
83.1 parts of 2-(2'-azacyclotridecylene)-cyclohexanone:

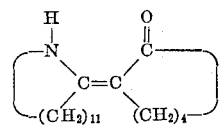

is boiled with 500 parts by volume of normal caustic soda solution for ten hours. The reaction mixture is worked up as in Example 4 and 18-amino-7-ketostearic acid is obtained in a 70% yield. Its melting point is 155° C. to 157° C. The melting point of the acid purified via the hydrochloride is 160° C. to 161° C. The melting point of the hydrochloride in a sealed tube is 157° C.

We claim:

1. A process for the production of omega-aminoketocarboxylic acids having the general Formula I:

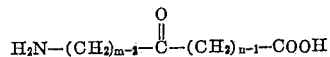

in which $m$ is one of the whole numbers from 5 to 15 inclusive and $n$ is one of the whole numbers from 5 to 12 inclusive, and salts of these acids, which comprises subjecting to hydrolysis a compound having the general formula:

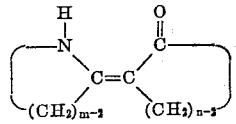

in which $m$ and $n$ have the means given above.

2. A process as claimed in claim 1 wherein $m$ denotes a whole number from 5 to 9 inclusive and $n$ denotes a whole number from 5 to 7 inclusive.

3. A process as claimed in claim 1 wherein the hydrolysis is carried out at a temperature between 80° C. and 110° C. and at a pH other than pH 1 to 13.

References Cited

Heinrich Hellmann and Gerd Aichinger, Chem. Ber. 92, 2122–27 (1959).

NICHOLAS S. RIZZO, *Primary Examiner.*

F. A. MIKA, *Assistant Examiner.*

UNITED STATES PATENT OFFICE
CERTIFICATE OF CORRECTION

Patent No. 3,359,290                        December 19, 1967

Siegfried Huenig et al.

It is certified that error appears in the above identified patent and that said Letters Patent are hereby corrected as shown below:

Column 2, line 66, "amounts or" should read -- amounts of --. Column 3, line 62, before "remaining" insert -- solution --.

Signed and sealed this 16th day of December 1969.

(SEAL)
Attest:

Edward M. Fletcher, Jr.                      WILLIAM E. SCHUYLER, JR.
Attesting Officer                                      Commissioner of Patents